United States Patent [19]
Karasawa

[11] Patent Number: 5,995,810
[45] Date of Patent: Nov. 30, 1999

[54] METHOD AND APPARATUS FOR CONTROLLING TRANSMISSION BAND

[75] Inventor: Satoru Karasawa, Tokyo, Japan

[73] Assignee: Oki Electric Industry Co., Ltd., Tokyo, Japan

[21] Appl. No.: 08/914,182

[22] Filed: Aug. 19, 1997

[30] Foreign Application Priority Data

Aug. 23, 1996 [JP] Japan .................................. H8-222132

[51] Int. Cl.⁶ ..................................................... H04B 1/02
[52] U.S. Cl. .......................... 455/103; 455/105; 370/230; 370/253; 370/395; 370/468
[58] Field of Search .................... 455/103, 105; 370/252, 253, 395, 465, 468, 230, 412

[56] References Cited

U.S. PATENT DOCUMENTS

| | | | |
|---|---|---|---|
| 5,526,529 | 6/1996 | Tamano ..................................... | 455/103 |
| 5,577,035 | 11/1996 | Hayter et al. ............................. | 370/395 |
| 5,584,058 | 12/1996 | Arnold ..................................... | 455/103 |
| 5,696,764 | 12/1997 | Soumiya et al. ......................... | 370/395 |
| 5,724,351 | 3/1998 | Chao et al. ............................... | 370/395 |
| 5,748,615 | 5/1998 | Riedel et al. ............................. | 370/253 |
| 5,793,766 | 8/1998 | Dieudonne et al. ..................... | 370/395 |
| 5,796,719 | 8/1998 | Peris et al. ............................... | 370/230 |

OTHER PUBLICATIONS

"Time Slot Assignment Method for ATM–PDS System", by Nakajima and Takigawa, 1993 Electronic Information Transmission Society.

"ATM Based Passive Double Star System Offering B–ISBN, N–ISBN, and POTS", by Y. Takizawa et al., Globcom '93, pp. 14–18, 1993.

*Primary Examiner*—Dwayne D. Bost
*Assistant Examiner*—Quochien B. Vuong
*Attorney, Agent, or Firm*—Wenderoth, Lind & Ponack, L.L.P.

[57] ABSTRACT

In a method for controlling transmission band, minimum intervals are provided for a plurality of signal sources, respectively, so that each of the signal sources turns into a condition where a signal can be transmitted therefrom when the minimum interval thereof is elapsed. The minimum interval for each of the signal sources is counted since the last signal is transmitted therefrom. A waiting time for each of the signal sources is counted since the minimum interval thereof is elapsed. One signal source is selected from the signal sources whose waiting time is the longest so that the selected signal source transmits a signal to the common transmission line. The minimum interval and the waiting time for the selected signal source are renewed in accordance with the time-slot interval and the waiting time thereof.

15 Claims, 10 Drawing Sheets

FIG. 3

| ONU NUBER | SPECIFIED CELL INTERVAL | OUTPUT CELL INTERVAL |
|---|---|---|
| 1-1 | 3 | 3.1075 |
| 1-2 | 1728 | 1728 |
| 1-3 | 16 | 16 |
| 1-4 | 1728 | 1728 |
| 1-5 | 54 | 54 |
| 1-6 | 1728 | 1728 |
| 1-7 | 72 | 72 |
| 1-8 | 576 | 576 |
| 1-9 | 1728 | 1728 |
| 1-10 | 288 | 288 |
| 1-11 | 3456 | 3456 |
| 1-12 | 1728 | 1728 |
| 1-13 | 9 | 9.023 |
| 1-14 | 576 | 576 |
| 1-15 | 100 | 99.999 |
| 1-16 | 54 | 53.999 |
| 1-17 | 144 | 144 |
| 1-18 | 6912 | 6912 |
| 1-19 | 1728 | 1728 |
| 1-20 | 3 | 3.070 |

METHOD AND APPARATUS FOR CONTROLLING TRANSMISSION BAND

CROSS REFERENCE TO RELATED APPLICATION

This application claims the priority of Application No. H8-222132, filed on Aug. 23, 1996 in Japan, the subject matter of which is incorporated herein by reference.

TECHNICAL FIELD OF THE INVENTION

The present invention relates to transmission band controlling technique; and more particularly to, a method and apparatus for transmitting a plurality of signals from a plurality of signals sources to a common transmission line in accordance with time-slot intervals, which are determined for the signal sources, respectively.

BACKGROUND OF THE INVENTION

In signal transmission technology, PDS (Passive Double Star) structure has been studied and researched to apply to ATM (Asynchronous Transfer Mode) network services. This kind of technology is described in literatures, "Time-Slot Distributing Method for ATM-PDS", by Nakajima and Takigawa, 1993 Electronic Information Transmission Society, Autumn Conference B-669, 1993; and "ATM Based Passive Double Star System Offering B-ISDN, N-ISDN and POTS" by Y. Takizawa et al., GLOBCOM '93, pp-14–18, 1993.

An optical communication system with ATM-PDS structure includes a plurality of ONUs (Optical Network Units), which are placed in subscribers' premises, an SLT (Subscriber Line Terminal) and a star couple connecting the ONUs and the SLT to each other using optical fibers. The SLT includes a plurality of OSUs (Optical Subscriber Unit) each operating as interface to the corresponding ONUs. An optical signal transmitted from the OSU is branched by the star coupler and the branched signals are transmitted to the ONUs in a downward direction. On the other hand, the star coupler multiplies optical signals from the ONUs and the multiplied signal is transmitted to the OSU in an upward direction. If the ONUs transmit optical signals independently in the upward direction, those signals are competed at the star coupler. For that reason, the OSU transmits a permission signal in the downward direction, which specifies one ONU, to allow only the specified ONU to transmits an optical signal in the upward direction.

In practice, an optical signal in the downward direction is transmitted cell by cell, which is ATM-PDS cell of sixty bites. The OSU adds at the first two bytes in the ATM-PDS cell an identification number specifying one ONU which is allowed to transmit an optical signal. When the specified ONU receives an ATM-PDS cell including its identification number, the ONU transmits a cell in the upward direction within a predetermined period of time. In ATM-PDS structure, the same width of transmission band is not always distributed to the ONUs. In other words, ONU identification numbers to be added in ATM-PDS cells in the downward direction are not equally distributed to the ONUs, but must be distributed in accordance with subscribers' contracts, respectively.

The OSU is provided with a band control circuit to control the distribution of transmission bands to the ONUs. A conventional band control circuit includes a plurality of transmission timing controllers, each operating for the corresponding ONU, and a competition controller, which arbitrates competing demand of transmission among the ONUs. Each of the transmission timing controller includes cell interval counter and a waiting time counter. Each of the cell interval counter is supplied with a specified cell interval of the corresponding ONU. Each cell interval counter is reset when a permission signal is supplied to the corresponding ONU, and perform increment operation. When the counted value of the interval counters reach the specified cell intervals, the counted values are maintained until a reset signal is supplied thereto. Each waiting time counter starts increment operation when the corresponding cell interval counter reaches the specified cell interval. The counted value of each waiting time counter represents a waiting time since the corresponding cell interval counter reaches the specified cell interval.

The competition controller selects one from the ONUs, whose waiting time is the longest which means the corresponding waiting counter stores the largest number, and transmits the identification number of the selected ONU. The identification number is supplied as a reset signal to the cell interval counter and the waiting time counter for the selected ONU.

According to conventional band control circuits, however, there is a disadvantage in that some ONUs can not transmit signals within the specified cell intervals thereof. The delay time may be a maximum of cell intervals corresponding to the number of ONUs connected to the OSU. In addition, none of the ONUs transmits an optical signal at a cell interval that is shorter than its specified cell interval. As a result, the contracted bands may not be distributed to the subscribers. In other words, the average of distributed cell interval for the ONU may be longer than the contracted cell interval.

OBJECTS OF THE INVENTION

Accordingly, an object of the invention is to provide a method for controlling transmission band, by which each signal source can reliably transmit signals in accordance with a contracted band thereof.

Another object of the invention is to provide an apparatus for controlling transmission band, which is able to distribute transmission bands respectively to a plurality of signal sources reliably.

Still another object of the invention is to provide a signal transmission system, which is able to distribute transmission bands respectively to a plurality of signal sources reliably.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentality and combinations particularly pointed out in the appended claims.

SUMMARY OF THE INVENTION

According to a first aspect of the invention, in a method for controlling transmission band, minimum intervals are provided for a plurality of signal sources, respectively, so that each of the signal sources turns into a condition where a signal can be transmitted therefrom when the minimum interval thereof is elapsed. The minimum interval for each signal source is counted since the last signal is transmitted therefrom. A waiting time for each signal source is counted since the minimum interval thereof is elapsed. One signal source is selected from the signal sources whose waiting time is the longest so that the selected signal source transmits a signal to the common transmission line. The minimum interval and the waiting time for the selected signal source are amended to renewal values, which are determined in accordance with the time-slot interval and the waiting time thereof.

According to a second aspect of the invention, an apparatus includes a plurality of transmission timing controllers provided for a plurality of signal sources, respectively. Each transmission timing controller includes a load value controller which provides a minimum interval for the corresponding signal source so that the corresponding signal source turns into a condition where a signal is able to be transmitted therefrom when the minimum interval is elapsed. Each transmission timing controller further includes a first counter which counts the minimum interval of the corresponding signal source since the last signal is transmitted therefrom; and a second counter which counts a waiting time since the minimum interval of the corresponding signal source is elapsed. The load value controller determines renewal values for the first and second counters in accordance with the time-slot interval and the waiting time thereof. Then, the load value controller renews the first and second counters into the renewal values, when the corresponding signal source transmits a signal. The apparatus further includes a competition controller which selects one from the signal sources whose waiting time is the longest so that the selected signal source transmits a signal to the common transmission line.

According to a third aspect of the invention, a signal transmission system includes a plurality of signal sources which transmit a plurality of signals, respectively; a signal receiver which receives the signals transmitted from the signal sources in accordance with time-slot intervals determined for the signal sources, respectively; a plurality of first signal lines coupled to the signal sources, respectively; a second signal line coupled to the signal receiver; and a signal coupler which couples the first signal lines and the second signal line. The signal receiver includes a plurality of transmission timing controllers for the signal sources, respectively. Each transmission timing controller includes a load value controller which provides a minimum interval for the corresponding signal source so that the corresponding signal source turns into a condition where a signal can be transmitted therefrom when the minimum interval is elapsed; a first counter which counts the minimum interval of the corresponding signal source since the last signal is transmitted therefrom; and a second counter which counts a waiting time since the minimum interval of the corresponding signal source is elapsed. The load value controller determines renewal values for the first and second counters in accordance with the time-slot interval and the waiting time thereof. Then, the load value controller renews the first and second counters into the renewal values, when the corresponding signal source transmits a signal. The transmission timing controller further includes a competition controller which selects one from the signal sources whose waiting time is the longest so that the selected signal source transmits a signal to the signal receiver.

According to the above-mentioned invention, transmission bands can be used efficiently, and therefor the transmission bands are reliably distributed to a plurality of signal sources.

BRIEF DESCRIPTION OF THE DRAWINGS

FIG. 3 is a table showing cell intervals obtained by the conventional technology.

DETAILED DISCLOSURE OF THE INVENTION

This invention is applicable to an ATM (Asynchronous Transfer Mode) system of band control apparatus used for a passive double star type of subscriber line transmission system. The invention is especially useful for signal transmission from subscribers to the network.

Figure 1:
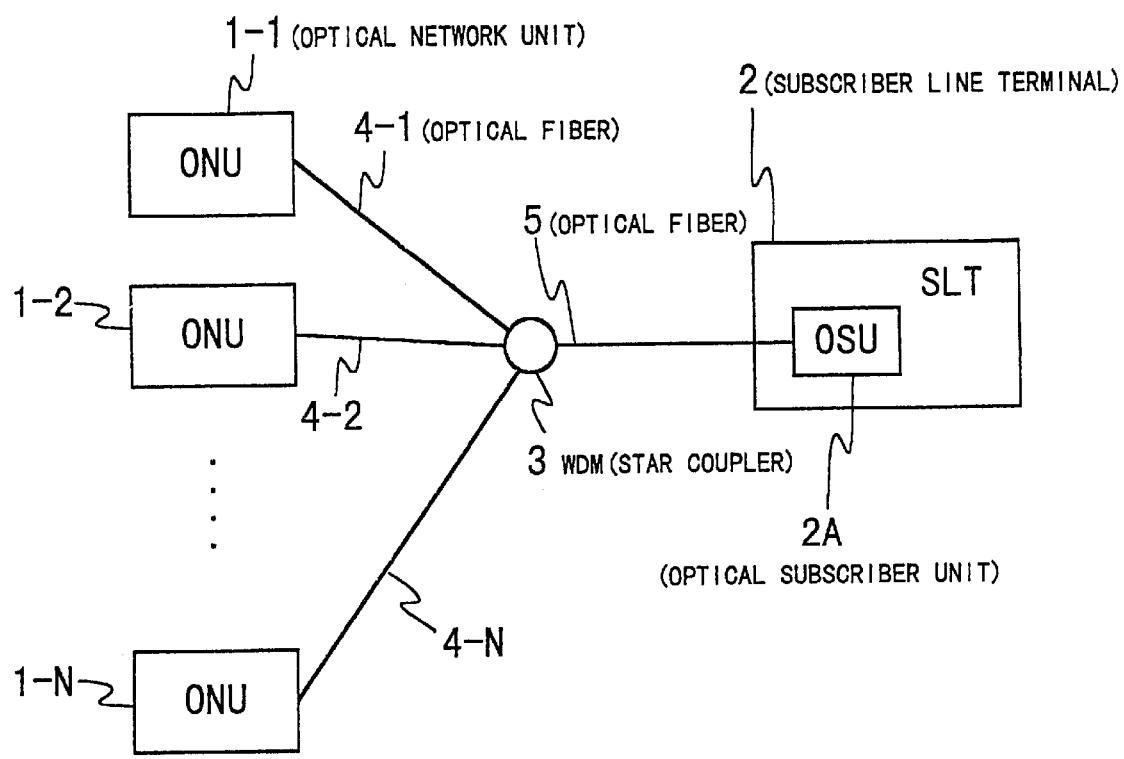
FIG. 1 is a block diagram showing an optical communication system (signal transmission system) to which the invention is applied.
Figure 2:
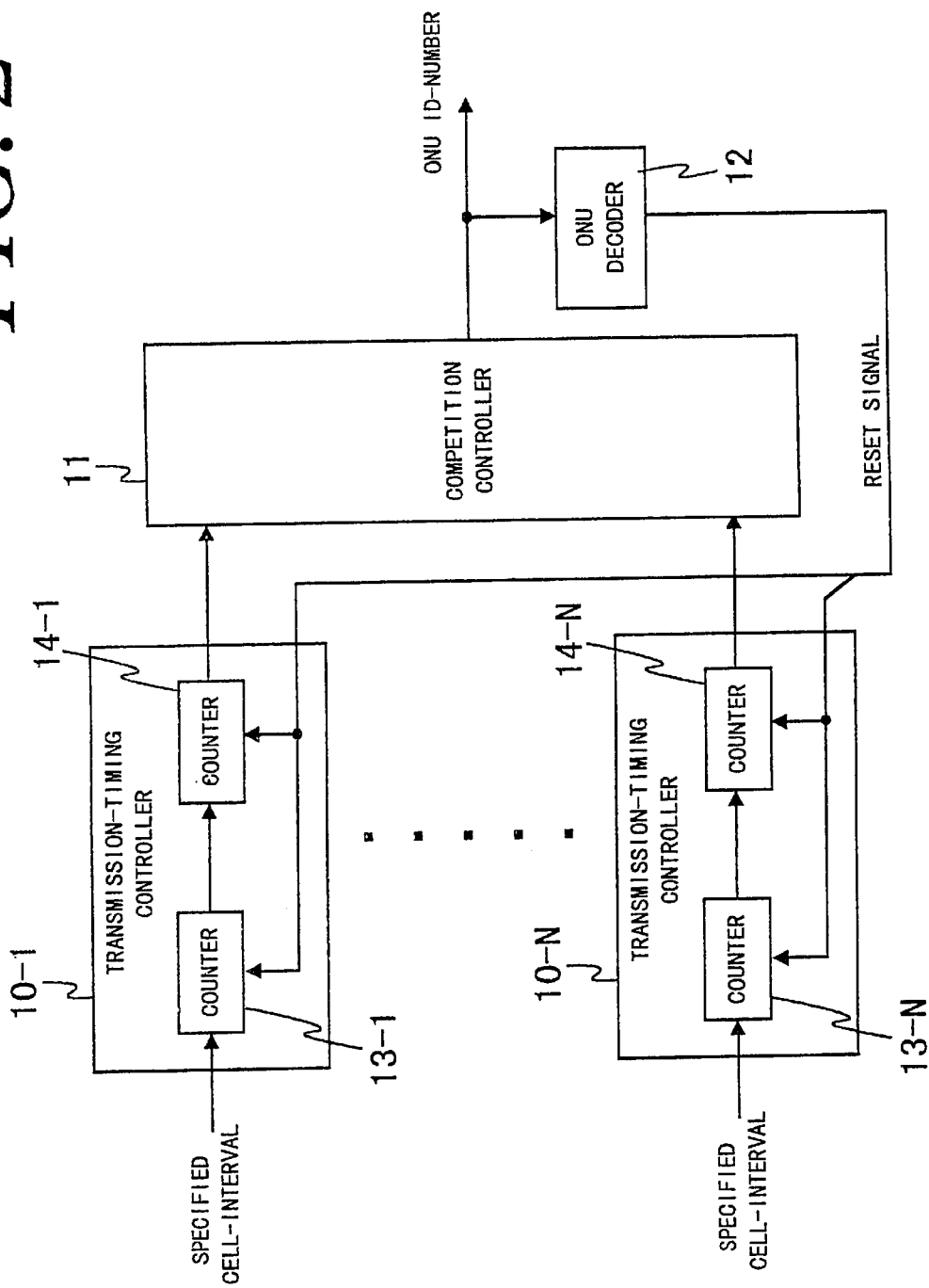
FIG. 2 is a block diagram showing a conventional optical subscriber unit, which is applied to the optical communication system shown in FIG. 1.

For better understanding of the invention, background technology is first described in conjunction with FIGS. 1 to 3.

FIG. 1 shows an optical communication system with ATM-PDS structure, which is one application of the invention. The invention is applicable to other types of signal transmission system. The optical communication system includes a plurality of ONUs (Optical Network Units) 1-1 to 1-N, which are placed in subscribers' premises, an SLT (Subscriber Line Terminal) 2 and a star couple 3. The star coupler 3 connects the ONUs 1-1 to 1-N and the SLT 2 to each other using optical fibers 4-1 to 4-N extending from the ONUs 1-1 to 1-N, respectively, and an optical fiber 5 extending from the SLT 2. The star coupler 3 is hereinafter called WDM (Wavelength Demultiplexer).

Each ONU is connected to a subscriber's terminal equipment (not shown) in accordance with UNI (User Network Interface). Each of the ONUs 1-1 to 1-N and the SLT 2 is equipped with an optical/electrical converter (not shown).

The SLT 2 includes a plurality of OSUs (Optical Subscriber Unit) 2A, in which only one OSU 2A is shown in FIG. 1. Each OSU 2A functions as interface to the corresponding ONUs 1-1 to 1-N. The OSU 2A and the WDM 3 are connected with the optical fiber 5 on a one-to-one correspondence.

The WDM 3 divides an optical signal transmitted from the OSU 2A, and the branched signals are transmitted to the ONUs 1-1 to 1-N in a downward direction. On the other hand, optical signals transmitted from the ONUs 1-1 to 1-N are multiplied by the WDM 3, and the multiplied signal is transmitted to the OSU 2A in an upward direction. The ONUs 1-1 to 1-N and the SLT 2 may be called signal sources and signal receiver, respectively, in the upward direction. If the ONUs 1-1 to 1-N transmit optical signals independently in the upward direction, those signals are conflicted at the WDM 3. For avoiding the conflict problem, the OSU 2A transmits a permission signal in the downward direction, which specifies one ONU, to allow only the specified ONU to transmits an optical signal in the upward direction.

In practice, an optical signal in the downward direction is transmitted cell by cell, which is ATM-PDS cell of sixty bites. The OSU 2A adds at the first two bytes in the ATM-PDS cell an identification number specifying one ONU 1-$i$ which is allowed to transmit an optical signal. When the specified ONU 1-$i$ receives an ATM-PDS cell including its identification number, the ONU 1-$i$ transmits a cell in the upward direction within a predetermined period of time. In ATM-PDS structure, the same width of transmission band in the upward direction is not always distributed to the ONU 1-1 to 1-N. In other words, ONU identification numbers to be added in ATM-PDS cells in the downward direction are not equally distributed to the ONU 1-1 to 1-N, but must be distributed in accordance with the subscribers' contracts, respectively.

FIG. 2 shows a conventional band control circuit, which controls the distribution of transmission. The conventional band control circuit includes transmission-timing controllers 10-1 to 10-N operating for the ONUs 1-1 to 1-N, respectively. The band control circuit also includes a competition controller 11 for arbitrating competing demand of transmission among the ONUs 1-1 to 1-N, and an ONU decoder 12 which decodes an identification number of ONU 1-$i$ supplied from the competition controller 11.

Each of the transmission timing controller 10-1 to 10-N includes cell interval counter 13-1 (13-$i$) and a waiting time counter 14-1 (14-$i$). It is assumed that transmission rate of the optical fibers 4-1 to 4-N and 5 is symbolized by "F" and distributed band for the ONU 1-$i$ is symbolized by "mx", where "x" represents the identification number of the ONU1-$i$, a cell interval of ATM-PDS cell is "F/mx". This cell interval is supplied to the cell interval counter 13-1 to 13-N as a specified cell-interval. The specified cell interval may be called contracted time-slot interval.

Each of the cell interval counters 13-1 to 13-N is reset when a permission signal is supplied for the corresponding ONU, and perform increment operation in synchronism with cell transmission timing signals (not shown). When the counted value reaches the specified cell interval, each cell interval counter 13-$i$ maintains the counted value until a reset signal is supplied thereto.

Each of the waiting time counter 14-1 to 14-N starts increment operation in synchronism with the cell transmission timing signals when the corresponding cell interval counter reaches the specified cell interval thereof. The counted value of each waiting time counter represents a waiting time since the corresponding cell interval counter reaches the specified cell interval after a permission signal is supplied for the corresponding ONU.

The competition controller 11 select one from the ONUs 1-1 to 1-N, whose waiting time is the longest, which means the corresponding waiting counter stores the largest number, and transmits the identification number of the selected ONU. The identification number is decoded by the ONU decoder 12 to generate a reset signal, which resets the cell interval counter and the waiting time counter for the selected ONU.

According to the above mentioned conventional band control circuit, however, there is a disadvantage in that some ONUs can not transmit signals within the specified cell intervals thereof. The delay time may be a maximum of cell intervals corresponding to the number of ONUs connected to the OSU 2A. In addition, none of the ONUs transmits an optical signal at a cell interval shorter than its specified cell interval. As a result, the contracted bands may not be distributed to the subscribers. In other words, the average of distributed cell interval for the ONU may be longer than the contracted cell interval, as shown in FIG. 3. In FIG. 3, ONU 1-1 has a specified (contracted) cell interval of three, however, the average cell interval of 3.1075 is distributed thereto in practice. If the transfer rate of the optical fiber 5 is 155.52 Mb/s, the practical transfer rate is delayed by more than 1 Mb/s for the payload band.

Next, preferred embodiments of the invention are described in conjunction with FIGS. 4 to 9.

Figure 4:
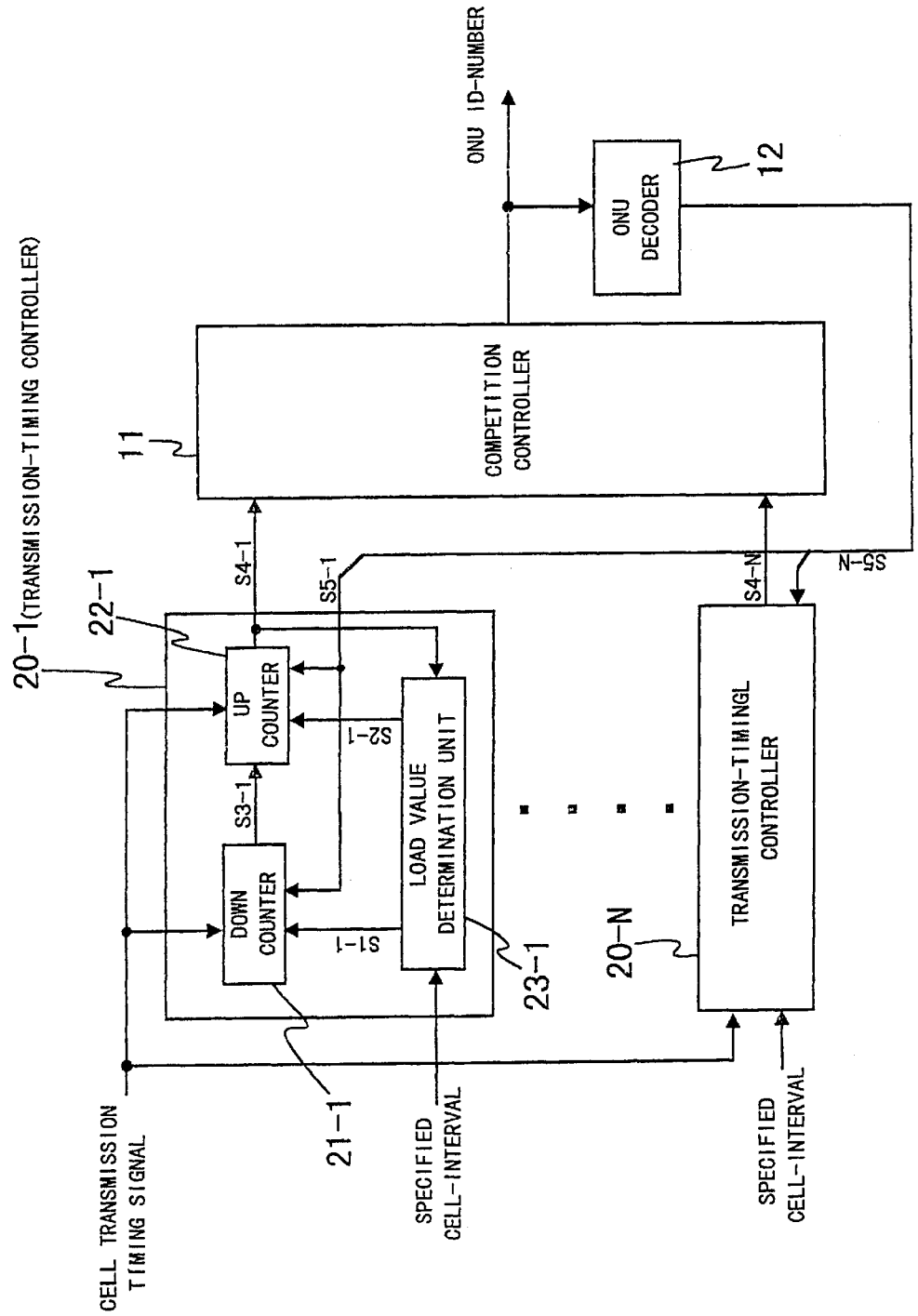
FIG. 4 is a block diagram showing an optical subscriber unit, which is applied to the optical communication system shown in FIG. 1, according to a first preferred embodiment of the invention.

FIG. 4 shows a band control circuit according to a first preferred embodiment, which is applied to a subscriber network system with ATM-PDS structure. The band control circuit arbitrates competing demand of transmission bands. In FIG. 4, corresponding or same components as those in FIG. 2 are represented by the same reference numbers and double description will be avoided.

In FIG. 4, the band control circuit includes transmission-timing controllers 20-1 to 20-N operating for the ONUs 1-1 to 1-N, respectively. The band control circuit also includes a competition controller 11 for arbitrating competing demand of transmission among the ONUs 1-1 to 1-N, and an ONU decoder 12 which decodes an identification number of ONU 1-$i$ ($i$=1 to N) supplied from the competition controller 11.

Each of the transmission timing controller 10-1 to 10-N includes a down counter 21-$i$ ($i$=1 to N) for counting cell interval of the corresponding ONU, and a up counter 22-$i$ for counting waiting time of the corresponding ONU. Each transmission timing controller also includes a load value determination unit 23-$i$ which generates renewal values to be loaded in the down counter 21-$i$ and up counter 22-$i$, respectively.

Each down counter 21-$i$ loads a first output signal S1-$i$ from the load value determination unit 23-$i$ when a decoded signal S5-$i$ from the ONU decoder 12 identifies the corresponding ONU. After the loading, each down counter 21-$i$ performs decrement operation from its initial value in synchronism with cell transmission timing signals (not shown). In each down counter 21-$i$, when the counted value S3-$i$ reaches zero, the value is maintained until a reset signal is supplied thereto.

Each up counter 22-$i$ loads a second output signal S2-$i$ from the load value determination unit 23-$i$ when a decoded signal S5-$i$ from the ONU decoder 12 identifies the corresponding ONU. After the loading, each up counter 22-$i$ performs increment operation from its initial value in synchronism with cell transmission timing signals (not shown) in a period where the corresponding down counter 21-$i$ maintains zero. An output signal S4-$i$ of each up counter 22-$i$ is supplied to the competition controller 11 and to the corresponding load value determination unit 23-$i$, respectively.

The load value determination units 23-1 to 23-N are supplied with specified cell-intervals, which are determined in accordance with the subscribers' contracts of the corresponding ONUs, respectively. The specified cell interval may be called time-slot interval. Each load value determination unit 23-$i$ generates the load values S1-$i$ and S2-$i$ to be loaded in the corresponding down counter 21-$i$ and up counter 22-$i$, respectively, based on the specified cell interval and the counted value S4-$i$ of the corresponding up counter 22-$i$. The load value S1-$i$ represents a so-called minimum interval. When the minimum interval thereof is elapsed, the corresponding ONU 1-$i$ turns into a condition where a signal can be transmitted therefrom.

Figure 5:
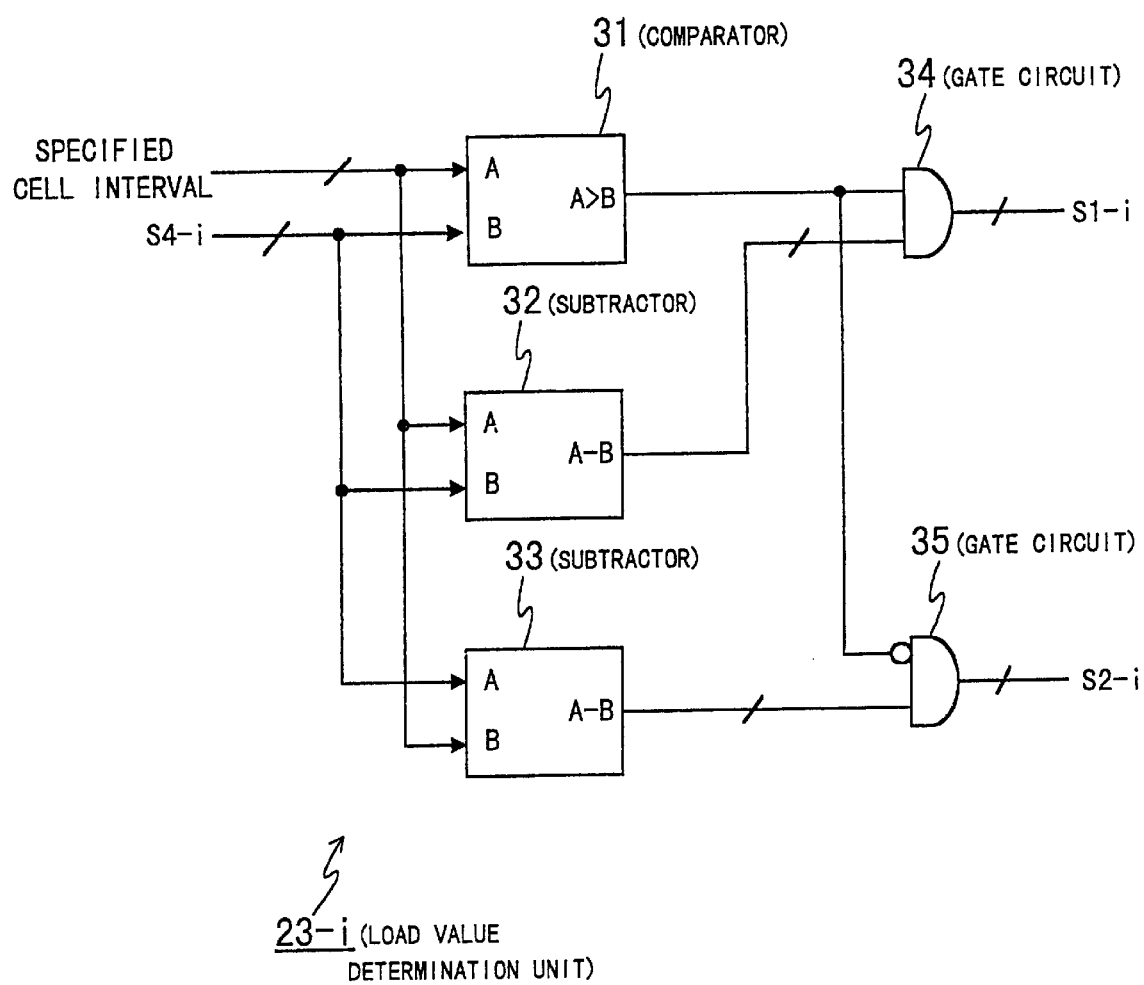
FIG. 5 is a logic circuit showing a load value determination unit used in the optical subscriber unit shown in FIG. 4.

FIG. 5 shows the detail of each load value determination unit 23-$i$, which includes a comparator 31, two subtractors 32 and 33, and two gate circuits 34 and 35. The comparator 31 compares the specified cell interval and the counted value S4-$i$ of the up counter 22-$i$, which is a waiting time for permission of cell transmission. When the specified cell interval is larger than the counted value S4-$i$, the gate circuit 34 opens and the gate circuit 35 closes. On the other hand, when the specified cell interval is not larger than the counted value S4-$i$, the gate circuit 34 closes and the gate circuit 35 opens.

The subtractor 32 subtracts the counted value S4-$i$ from the specified cell interval, and supplies the subtracted value to the gate circuit 34. On the other hand, the subtractor 33 subtracts the specified cell interval from the counted value S4-$i$, and supplies the subtracted value to the gate circuit 35. The gate circuits 34 and 35 may be two-input type of AND circuits corresponding to the number of output bits of the subtractors 32 and 33, respectively.

The gate circuit 34 allows the output of the subtractor 32 (="specified cell interval"-"counted value S4-$i$") to pass through there, when the specified cell interval is larger than the counted value S4-$i$. The gate circuits 34 outputs zero to the down counter 21-$i$ as the load value S1-$i$, when the specified cell interval is not larger than the counted value S4-$i$.

The competition controller 11 selects one from the ONUs 1-1 to 1-N, whose waiting time is the longest which means the corresponding waiting counter stores the largest number, and transmits the identification number of the selected ONU. If a plurality of up counters 22-$i$ have the same counted value S4-$i$ which are the largest, the competition controller 11 changes the order of comparison. For instance, the competition controller 11 starts the comparison of the counted values S4-1 to S4-N with the last-selected ONU, and this time, selects an ONU which is compared in the end.

The ONU decoder 12 decodes the identification number supplied from the competition controller 11. The decoded identification number is supplied to the down counter 21-$i$ and the up counter 22-$i$ of the transmission timing controller 20-$i$ corresponding to the selected ONU. In response to the decoded identification number, the down counter 21-$i$ and the up counter 22-$i$ start loading the load values supplied from the load value determination unit 23-$i$, respectively. Even though the load values are supplied from the load value determination unit 23-$i$ to the counters 21-$i$ and 22-$i$, the load values are not loaded in the counters 21-$i$ and 22-$i$ until the decoded identification number representing the corresponding ONU is supplied.

Figure 6:
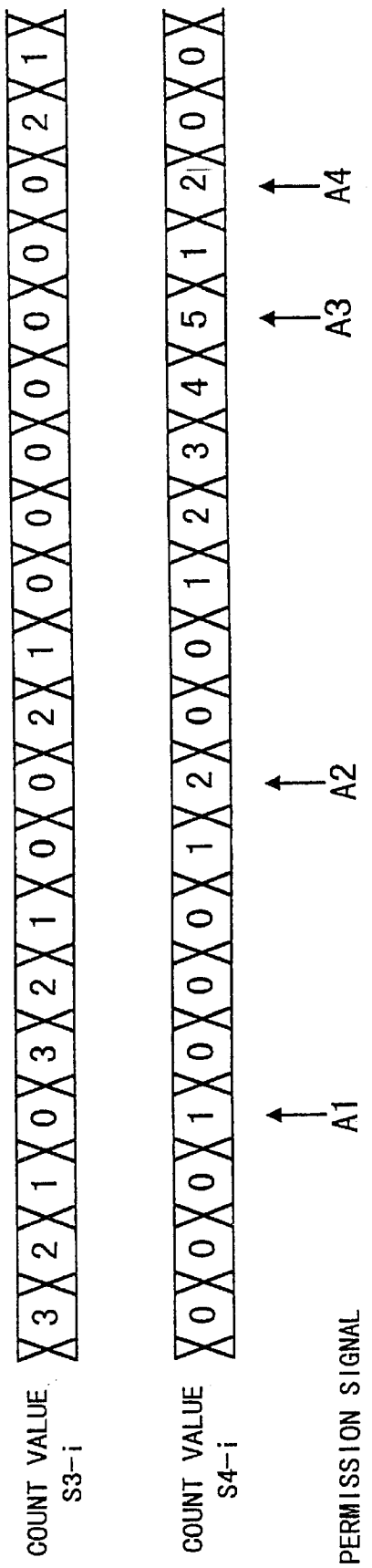
FIG. 6 is a timing chart showing the operation of the first preferred embodiment.

FIG. 6 is a timing chart showing changes of counted values S3-$i$ and S4-$i$ of the down counter 21-$i$ and the up counter 22-$i$ of the transmission timing controller 20-$i$, respectively, in the case where a specified cell interval of four is supplied thereto. In this case, the counted values S3-$i$ and S4-$i$ are three and zero at the beginning, respectively. From the initial state, the down counter 21-$i$ performs decrement operation in synchronism with the cell transmission timing signals, so that the counted value S3-$i$ turns into two, one and zero successively. When the counted value S3-$i$ turns into zero, the up counter 22-$i$ performs increment operation, so that the counted value S4-$i$ turns into one.

If the counted values of the up counters of all the other transmission timing controllers are maintained at zero while the up counter 22-$i$ of the transmission timing controller 20-$i$ has a counted value S4-$i$ of one; the competition controller 11 supplies a permission signal A1 to the transmission timing controller 20-$i$ to select the corresponding ONU 1-$i$. The permission signal is the identification number of the selected ONU 1-$i$. The ONU decoder 12 decodes the identification number to supply the decoded signal to the down counter 21-$i$ and the up counter 22-$i$ corresponding to the selected ONU 1-$i$ so that the counters 21-$i$ and 22-$i$ perform loading operation. The load value determination unit 23-$i$ determines load values S1-$i$ of three (=4−1) and S2-$i$ of zero, in accordance with the specified cell interval of four and the counted value S4-$i$. Then, the down counter 21-$i$ and the up counter 22-$i$ load the load values S1-$i$ and S2-$i$, respectively.

After that, the down counter 21-$i$ decrements the counted value S3-$i$ to zero in synchronism with the cell transmission timing signals. In spite that the counted value S4-$i$ of the up counter 22-$i$ turns into one, the competition controller 11 selects another ONU. As a result, the up counter 22-$i$ increments the counted value S4-$i$ to two at the next cell transmission timing.

In this embodiment, the competition controller 11 selects the ONU 1-$i$ and supplies a permission signal A2 to the corresponding transmission timing controller 20-$i$, when the counted value S4-$i$ turns into two. In response to the permission signal, the load value determination unit 23-$i$ supplies the load value S1-$i$ of two (=4−2) to the down counter 21-$i$ and the load value S2-$i$ of zero to the up counter 22-$i$. The load value S1-$i$ of two is obtained by subtracting the counted value S4-$i$ of two from the specified cell interval of four. These load values S1-$i$ and S2-$i$ are loaded in the down counter 21-$i$ and the up counter 22-$i$, respectively.

The permission signal A2 is one cell behind the specified cell interval of the selected ONU 1-$i$, so that the load value S1-$i$ to the down counter 21-$i$ becomes one cell smaller than that with the last permission signal A1. In other words, a period between the permission signal A2 and the following permission signal A3 is shortened by one cell, which is the difference between the specified cell interval and the waiting time. As a result, the average cell interval for each ONU becomes close to the specified cell interval thereof.

After the permission signal A2, the down counter 21-$i$ performs increment operation, in synchronism with the cell transmission timing signals, to turn the counted value S3-$i$ into zero. In response to the turning of the counted value S3-$i$ into zero, the up counter 22-$i$ performs increment operation to turn the counted value S4-$i$ into one. During the period, the competition controller 11 continues to select the other ONUs. When the up counter 22-$i$ turns its counted value S4-$i$ into five, the competition controller 11 supplies a next permission signal A3 to the transmission timing controller 20$i$ to select the corresponding ONU 1-$i$. At this time, the counted value S4-$i$ is five, so that the load value determination unit 23-$i$ supplies the load value S1-$i$ of zero to the down counter 21-$i$, and the load value S2-$i$ of one (=5−4) to the up counter 22-$i$. The load value S1-$i$ of zero is generated with the closed gate circuit 34.

If the waiting time becomes not less than the specified cell interval since the counted value S4-$i$ turns into one, the counted value S4-$i$ is renewed to a value obtained by subtracting the specified cell interval from the waiting time. As a result, an interval between the last permission signal and the following permission signal is shortened. After that, the above mentioned operation is repeated.

As described before, according to the first preferred embodiment of the invention, a waiting time (S4-$i$) is compared to the specified cell interval for the corresponding ONU 1-$i$, and the down counter 21-$i$ and the up counter 22-$i$ are renewed in accordance with the result of the comparison. And therefore, an ONU, which had a longer waiting time for the last transmission, can have a shorter waiting time for the next transmission of signal. Consequently, time slots (transmission bands) can be used efficiently, and therefor the contracted cell intervals (transmission bands) are reliably distributed to all the ONU 1-1 to 1-N desirably. As a result the problem, in that contracted bands are not distributed to the ONU 1-1 to 1-N reliably, may be solved.

In addition, the competition controller 11 compares the counted values S4-1 to S4-N in controlled orders every time to select one ONU. In other words, it is avoided that the same ONU is selected successively when a plurality of up counters 22-$n$ have the same counted value S4-$n$ for some period. As a result, it can be avoided that only specific ONUs tend to be selected easily.

Figure 7:
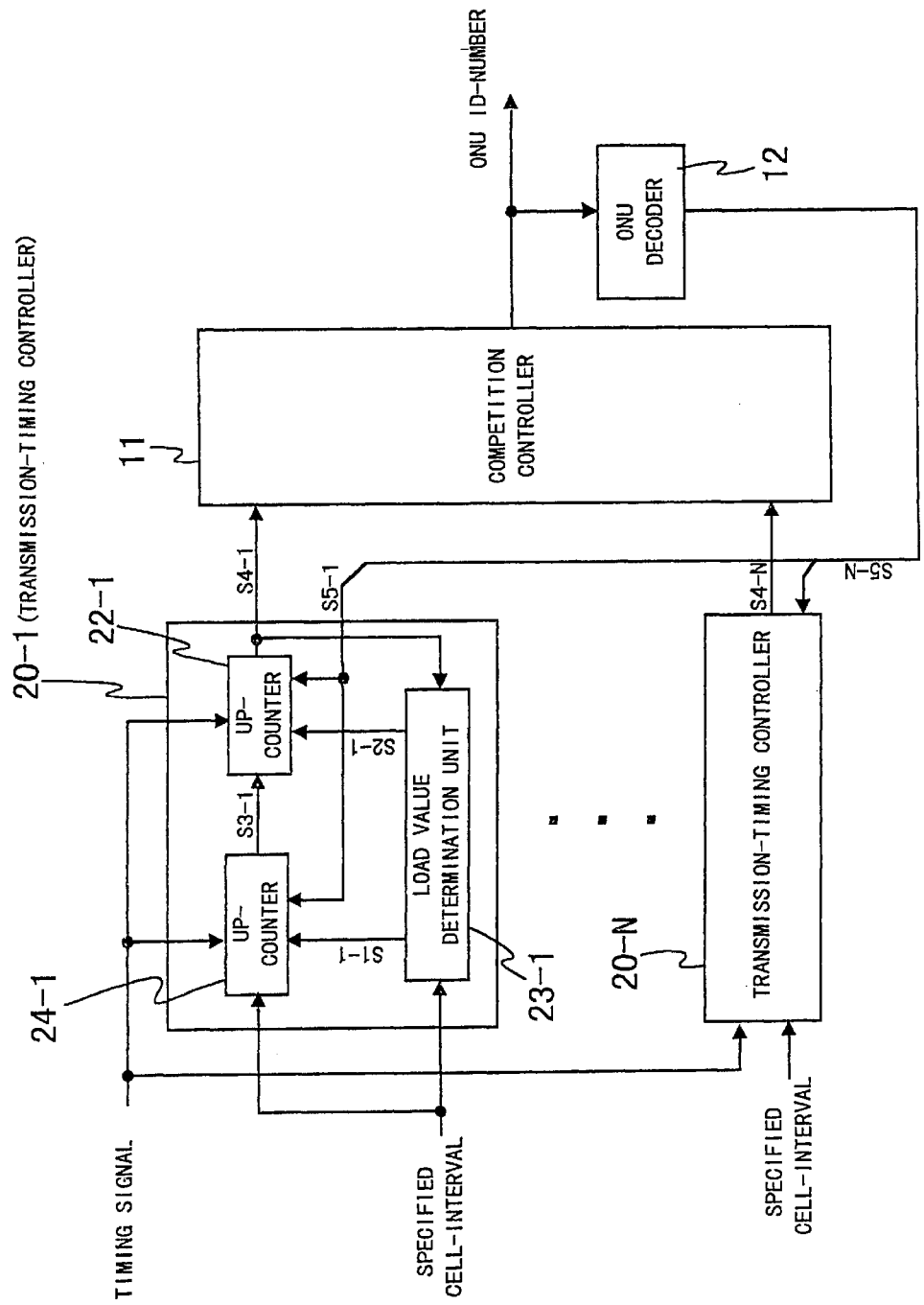
FIG. 7 is a block diagram showing an optical subscriber unit, which is applied to the optical communication system shown in FIG. 1, according to a second preferred embodiment of the invention.

FIG. 7 shows a band control circuit according to a second preferred embodiment, which is applied to a subscriber network system with ATM-PDS structure. The band control circuit arbitrates competing demand of transmission bands, as well as the first preferred embodiment. In FIG. 7, the same reference numbers represents corresponding or same components as those in FIGS. 2 and 4, and double description will be avoided.

In the second preferred embodiment, up counters 24-1 to 24-N are employed to count minimum intervals, while the down counters 21-1 to 21-N are employed in the first preferred embodiment shown in FIG. 4. When the minimum interval of an up counter 24-$i$ is elapsed, the corresponding ONU 1-$i$ turns into a condition where a signal can be transmitted therefrom.

Each up counter 24-$i$ loads a first output signal S1-$i$ of the load value determination unit 23-$i$ when the ONU decoder 12 supplies a decoded signal S5-$i$ representing the corresponding ONU 1-$i$. Then, the up counter 24-$i$ performs increment operation in synchronism with the cell transmission timing signals until the specified cell interval of the corresponding ONU 1-$i$ is elapsed. The up counter 24-$i$ maintains the counted value of the specified cell interval. Each up counter 24-$i$ has a minimum value of one and a maximum value of the specified cell interval of the corresponding ONU 1-$i$.

The up counters 22-1 to 22-N for counting waiting time are almost the same as those in the first preferred embodiment. Each up counter 22-$i$ performs increment operation during the corresponding up counter 24-$i$ maintains a value S3-$i$ that is one less than the specified cell interval.

Figure 8:
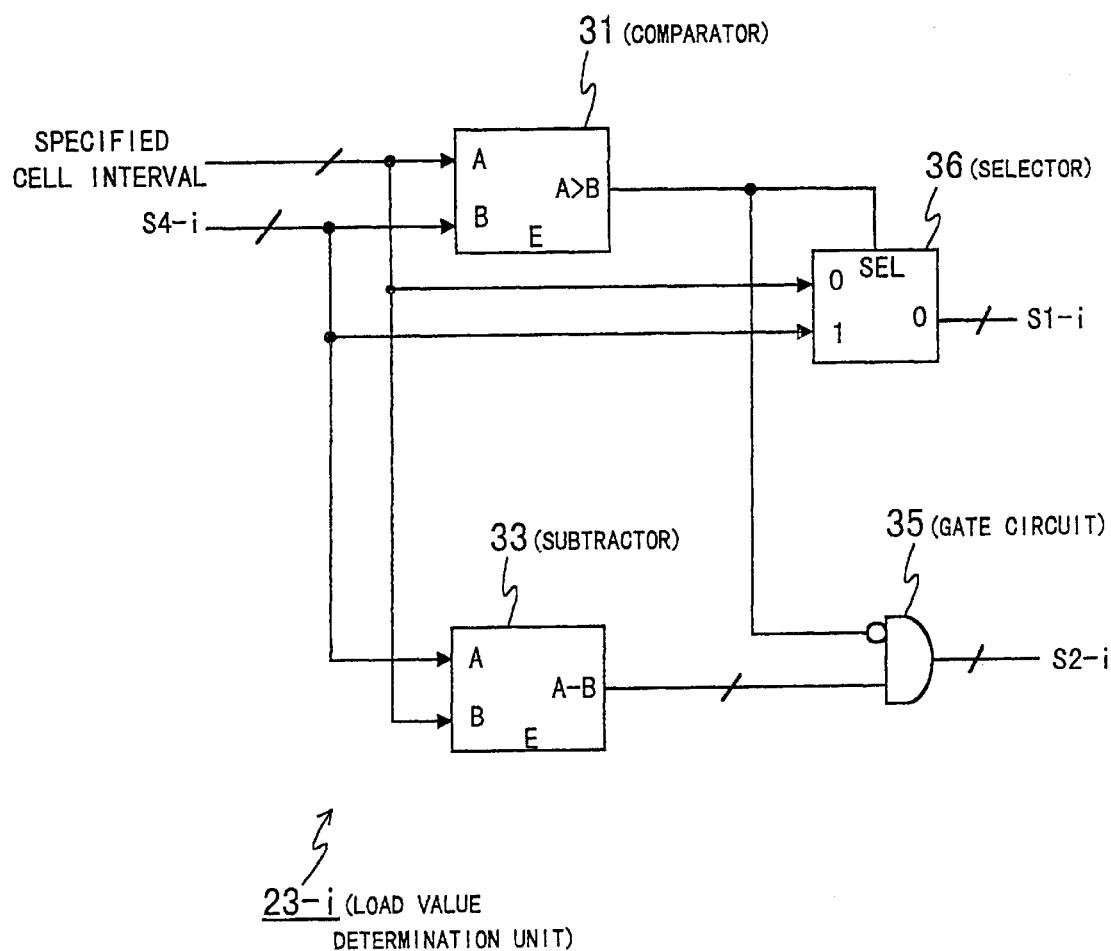
FIG. 8 is a logic circuit showing a load value determination unit used in the optical subscriber unit shown in FIG. 7.

FIG. 8 shows the load value determination unit 23-$i$ used in the band control circuit of the second preferred embodiment shown in FIG. 7. The load value determination unit 23-$i$ is designed different from that in the first preferred embodiment, because the second preferred embodiment use the up counter 24-$i$ instead of the down counter 21-$i$ in the first preferred embodiment. The load value determination unit 23-$i$ includes a comparator 31, a subtractor 33, a selector 36 and a gate circuits 35. The comparator 31 compares the specified cell interval and the counted value S4-$i$ of the up counter 22-$i$, which is a waiting time for cell transmission. In the second preferred embodiment, the selector 36 is used instead of both the subtractor 32 and the gate circuit 34 in the first preferred embodiment.

The selector is supplied at a zero-input terminal with the specified cell interval and at a one-input terminal with the counted value S4-$i$ of the up counter 22-$i$. The selector is also supplied at a selection control terminal SEL with the output of the comparator 31. When the specified cell interval is larger than the counted value S4-$i$, the selector 36 allows the counted value S4-$i$ to pass through there. On the other hand, when the specified cell interval is not larger than the counted value S4-$i$, the selector 36 allows the specified cell interval to pass through as the load value S1-$i$ to the up counter 24-$i$.

Figure 9:
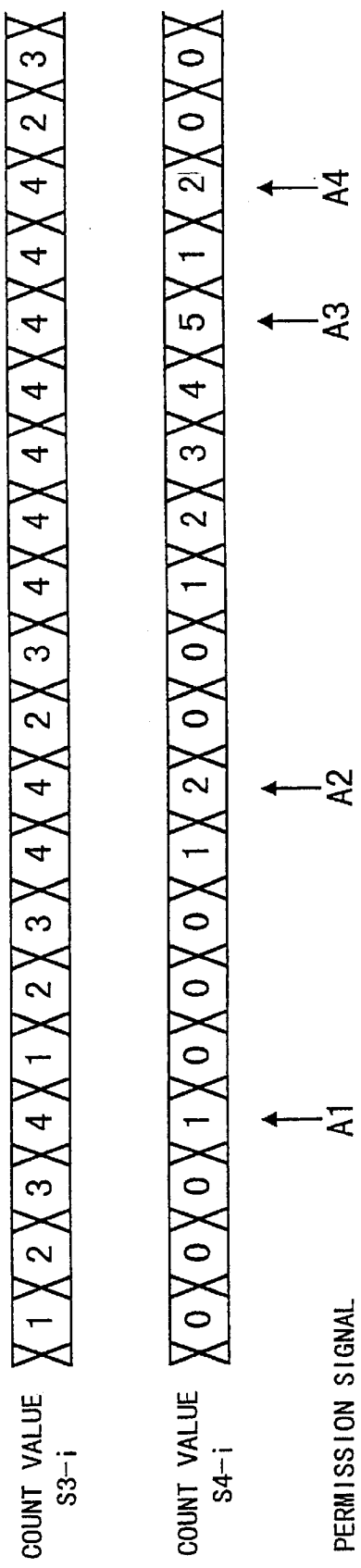
FIG. 9 is a timing chart showing the operation of the second preferred embodiment.

FIG. 9 is a timing chart showing changes of counted values S3-$i$ and S4-$i$ of the up counter 22-$i$ and the up counter 24-$i$ of the transmission timing controller 20-$i$, respectively, in the case where a specified cell interval of four is distributed. In this case, the counted values S3-$i$ and S4-$i$ are initially set at one and zero at the beginning, respectively. It is understood from FIGS. 6 and 9, the counted value S3-$i$ increases one by one in the second embodiment, while the counted value S3-$i$ decreases one by one in the first preferred embodiment. That is all the difference between those two embodiments, so that double description is avoided here.

According to the second preferred embodiment, the same advantage as the first preferred embodiment can be obtained. In addition, the load value determination units 23-1 to 23-N, shown in FIG. 8, can be designed simpler as compared to those in the first preferred embodiment.

Down counters can be used as waiting time counters in stead of the up counters 22-1 to 22-N in the first and second preferred embodiments. If a waiting time is never larger than its specified cell interval, the waiting counter can be designed to have renewal value of zero all the time. Depending on the minimum counted values of the minimum interval counters and waiting time counters, the load value determination units can have different arithmetic formulas, which are modification from those in the above mentioned embodiments. In the above-mentioned embodiments, the transmission-timing controllers are designed by hardware, but can be designed by software instead.

Figure 10:
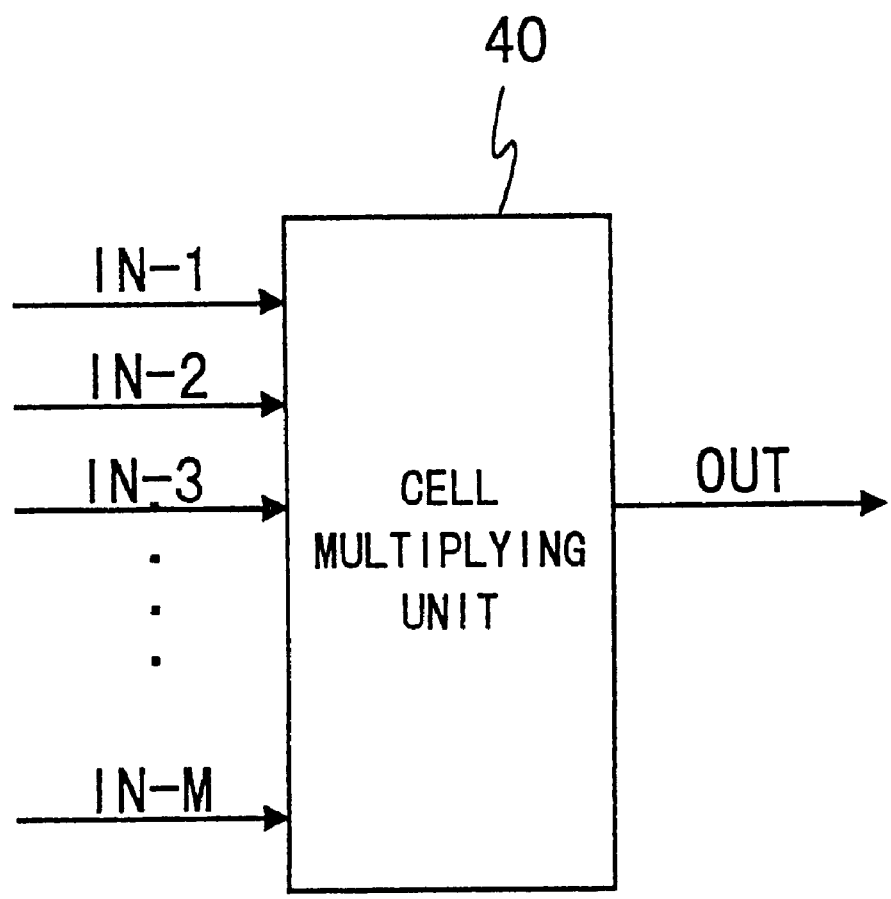
FIG. 10 is a conceptual view showing another application of the invention.

The invention is applicable not only to a band control circuit for a subscriber line network with ATM-PDS structure, but also to other types of apparatus and system. For instance, the invention is applicable to a band control circuit for a cell-multiplying unit 40, shown in FIG. 10. The cell-multiplying unit 40 is connected to a plurality of input lines IN-1 to IN-M, each has own contracted band. The cell-multiplying unit 40 multiplies cells transmitted from the input lines IN-1 to IN-M. In such a cell-multiplying unit, an output signal is generally arbitrated based on a condition while cells are supplied to the cell-multiplying unit. In other words, band arbitration is performed after confirming the arrival of cells from the input lines in general. The invention is applicable to the cell-multiplying unit 40, which arbitrates band distribution without confirming the arrival of cells transmitted from the input lines.

Although the invention has been described with respect to the specific embodiments for complete and clear disclosure, the appended claims are not be thus limited but are to be construed as embodying all modification and alternative constructions that may occur to one skilled in the art which fairly fall within the basic teaching herein set forth.

What is claimed is:

1. A method for controlling transmission band in a signal transmission system, in which a plurality of signals are transmitted from a plurality of signal sources to a common transmission line in accordance with respectively determined time-slot intervals, which comprises the steps of:

providing minimum intervals for the signal sources, respectively, so that each of the signal sources turns into a condition where a signal can be transmitted therefrom when the minimum interval thereof is elapsed;

counting the minimum interval for each of the signal sources since the last signal is transmitted therefrom;

counting a waiting time for each of the signal sources since the minimum interval thereof is elapsed;

selecting one from the signal sources whose waiting time is the longest so that the selected signal source transmits a signal to the common transmission line;

determining renewal values of the minimum interval and the waiting time in accordance with the time-slot interval thereof and the waiting time, when the corresponding signal source is selected; and renewing the minimum interval and the waiting time into the determined renewal.

2. The method for controlling transmission band, according to claim 1, wherein, the time-slot interval and the waiting time for the selected signal source are compared to each other for determining the renewal values.

3. The method for controlling transmission band, according to claim 1, wherein, if the waiting time is not less than the time-slot interval, the minimum interval and the waiting time for the selected signal source are renewed so that the signal source will be selected easily for the next signal.

4. An apparatus for controlling transmission band in a signal transmission system, in which a plurality of signals are transmitted from a plurality of signal sources to a common transmission line in accordance with respectively determined time-slot intervals, which comprises:

a plurality of transmission timing controllers provided for the signal sources, respectively; wherein, each transmission timing controller comprises:

(1) a load value controller which provides a minimum interval for the corresponding signal source so that the corresponding signal source turns into a condition where a signal can be transmitted therefrom when the minimum interval is elapsed;

(2) a first counter which counts the minimum interval of the corresponding signal source since the last signal is transmitted therefrom; and (3) a second counter which counts a waiting time since the minimum interval of the corresponding signal source is elapsed; wherein the load value controller determines renewal values for the first and second counters in accordance with the time-slot interval and the waiting time thereof, when the corresponding signal source is selected; and renews the first and second counters into the renewal values, and a competition controller which selects one from the signal sources whose waiting time is the longest so that the selected signal source transmits a signal to the common transmission line.

5. The apparatus for controlling transmission bands, according to claim 4, further comprises:

a renewal controller which provides a permission signal to allow the load value controller to perform the renewal operation.

6. The apparatus for controlling transmission bands, according to claim 4, wherein, the first counter is a down counter which performs decrement operation from an initial value thereof, and the second counter is an up counter which perform increment operation from an initial value thereof in synchronism with the first counter.

7. The apparatus for controlling transmission bands, according to claim 6, wherein, the load value controller determines the renewal value for the first counter by subtracting the waiting time from the time-slot interval, and the renewal value for the second counter as the initial value thereof, if the waiting time is less than the time-slot interval when the corresponding signal source is selected by the competition controller; and the load value controller determines the renewal value for the first counter as the initial value thereof, and the renewal value for the second counter by subtracting the time-slot interval from the waiting time, if the waiting time is not less than the time-slot interval when the corresponding signal source is selected by the competition controller.

8. The apparatus for controlling transmission bands, according to claim 4, wherein, the first counter is an up counter which performs increment operation from an initial value thereof, and the second counter is an up counter which performs increment operation from an initial value thereof in synchronism with the first counter.

9. The apparatus for controlling transmission bands, according to claim 8, wherein, the load value controller determines the renewal value for the first counter as the waiting time and the renewal value for the second counter as the initial value thereof, if the waiting time is less than the time-slot interval when the corresponding signal source is selected by the competition controller; and the load value controller determines the renewal value for the first counter as the time-slot interval of the corresponding signal source, and the renewal value for the second counter by subtracting the time-slot interval from the waiting time, if the waiting time is not less than the time-slot interval when the corresponding signal source is selected by the competition controller.

10. A signal transmission system, which comprises:

a plurality of signal sources which transmit a plurality of signals, respectively;

a signal receiver which receives the signals transmitted from the signal sources in accordance with time-slot intervals determined for the signal sources, respectively;

a plurality of first signal lines coupled to the signal sources, respectively;

a second signal line coupled to the signal receiver; and a signal coupler which couples the first signal lines and the second signal line, wherein, the signal receiver comprises:

(1) a plurality of transmission timing controllers for the signal sources, respectively, each comprising:

a load value controller which provides a minimum interval for the corresponding signal source so that the corresponding signal source turns into a condition where a signal is able to be transmitted therefrom when the minimum interval is elapsed;

a first counter which counts the minimum interval of the corresponding signal source since the last signal is transmitted therefrom; and a second counter which counts a waiting time since the minimum interval of the corresponding signal source is elapsed; wherein
the load value controller determines renewal values for the first and second counters in accordance with the time-slot interval and the waiting time thereof, when the corresponding signal source is selected; and renews the first and second counters into the renewal values, and (2) a competition controller which selects one from the signal sources whose waiting time is the longest so that the selected signal source transmits a signal to the signal receiver.

11. The signal transmission system, according to claim 10, wherein,
the transmission timing controller further comprises a renewal controller which provides a permission signal to allow the load value controller to perform the renewal operation.

12. The signal transmission system, according to claim 10, wherein,
the first counter is a down counter which performs decrement operation from an initial value thereof, and
the second counter is an up counter which perform increment operation from an initial value thereof in synchronism with the first counter.

13. The signal transmission system, according to claim 12, wherein,
the load value controller determines the renewal value for the first counter by subtracting the waiting time from the time-slot interval, and the renewal value for the second counter as the initial value thereof, if the waiting time is less than the time-slot interval when the corresponding signal source is selected by the competition controller; and
the load value controller determines the renewal value for the first counter as the initial value thereof, and the renewal value for the second counter by subtracting the time-slot interval from the waiting time, if the waiting time is not less than the time-slot interval when the corresponding signal source is selected by the competition controller.

14. The signal transmission system, according to claim 10, wherein,
the first counter is an up counter which performs increment operation from an initial value thereof, and
the second counter is an up counter which performs increment operation from an initial value thereof in synchronism with the first counter.

15. The signal transmission system, according to claim 14, wherein,
the load value controller determines the renewal value for the first counter as the waiting time and the renewal value for the second counter as the initial value thereof, if the waiting time is less than the time-slot interval when the corresponding signal source is selected by the competition controller; and
the load value controller determines the renewal value for the first counter as the time-slot interval of the corresponding signal source, and the renewal value for the second counter by subtracting the time-slot interval from the waiting time, if the waiting time is not less than the time-slot interval when the corresponding signal source is selected by the competition controller.

* * * * *